(12) United States Patent
Creech et al.

(10) Patent No.: US 10,190,673 B2
(45) Date of Patent: Jan. 29, 2019

(54) ACTIVE OIL MANAGEMENT SYSTEM FOR AXLES

(71) Applicant: Dana Heavy Vehicle Systems Group, LLC, Maumee, OH (US)

(72) Inventors: Michael Z. Creech, Ann Arbor, MI (US); Marcus W. Schmidt, Swanton, OH (US)

(73) Assignee: Dana Heavy Vehicle Systems, LLC, Maumee, OH (US)

( * ) Notice: Subject to any disclaimer, the term of this patent is extended or adjusted under 35 U.S.C. 154(b) by 92 days.

(21) Appl. No.: 15/365,251

(22) Filed: Nov. 30, 2016

(65) Prior Publication Data

US 2018/0149261 A1 May 31, 2018

(51) Int. Cl.
*F16H 57/04* (2010.01)

(52) U.S. Cl.
CPC ....... *F16H 57/0483* (2013.01); *F16H 57/045* (2013.01); *F16H 57/0423* (2013.01); *F16H 57/0424* (2013.01); *F16H 57/0435* (2013.01); *F16H 57/0452* (2013.01); *F16H 57/0457* (2013.01); *F16H 57/0447* (2013.01)

(58) Field of Classification Search
None
See application file for complete search history.

(56) References Cited

U.S. PATENT DOCUMENTS

| | | | |
|---|---|---|---|
| 1,631,217 A | 6/1927 | Matthews | |
| 2,860,850 A | 11/1958 | Rhodes et al. | |
| 3,410,519 A | 11/1968 | Evans | |
| 3,433,256 A | 3/1969 | Stillhard et al. | |
| 3,758,071 A | 9/1973 | Anderson et al. | |
| 4,300,595 A | 11/1981 | Mayer et al. | |
| 5,453,181 A | 9/1995 | Dahlback et al. | |
| 5,540,300 A | 7/1996 | Downs et al. | |
| 6,105,931 A | 8/2000 | Frank et al. | |
| 6,299,561 B1 | 10/2001 | Kramer et al. | |
| 6,651,953 B2 | 11/2003 | Weldon | |
| 6,866,605 B2 * | 3/2005 | Fabry | B62D 11/16 475/160 |
| 6,896,108 B2 | 5/2005 | Schneider et al. | |

(Continued)

FOREIGN PATENT DOCUMENTS

| | | |
|---|---|---|
| DE | 3630973 A1 | 3/1987 |
| EP | 1918613 A2 | 5/2008 |

(Continued)

OTHER PUBLICATIONS

European Patent Office, Extended European Search Report with written opinion issued in Application EP 17204534, dated Mar. 15, 2018, 10 pages, European Patent Office, Munich Germany.

*Primary Examiner* — Dirk Wright
(74) *Attorney, Agent, or Firm* — Marshall & Melhorn, LLC

(57) ABSTRACT

An apparatus for regulating lubricant having a carrier housing including a lubricant sump. A ring gear disposed within the carrier housing, wherein the ring gear is partially disposed in the lubricant sump. A lubricant catch is disposed in the carrier housing, and a reservoir is disposed outside of the carrier housing. A first conduit is disposed between the lubricant catch and the reservoir. A second conduit is disposed between the reservoir and the lubricant sump. A valve is in fluid communication with the reservoir and the lubricant sump.

14 Claims, 6 Drawing Sheets

(56) References Cited

U.S. PATENT DOCUMENTS

| | | | |
|---|---|---|---|
| 6,997,284 | B1 | 2/2006 | Nahrwold |
| 7,963,186 | B2 * | 6/2011 | Hayes ................. F16H 57/0421 |
| | | | 184/6.12 |
| 8,512,193 | B1 | 8/2013 | Hilker et al. |
| 8,671,981 | B2 | 3/2014 | Lang |
| 8,672,094 | B2 * | 3/2014 | Quehenberger .... F16H 57/0419 |
| | | | 184/6.12 |
| 8,844,396 | B2 | 9/2014 | Myers et al. |
| 9,052,009 | B2 * | 6/2015 | Barillot ............... F16H 57/0409 |
| 9,309,961 | B2 | 4/2016 | Martucci et al. |
| 2009/0014248 | A1 | 1/2009 | Yamashita et al. |
| 2010/0108933 | A1 | 5/2010 | Takeshita |
| 2010/0180721 | A1 | 7/2010 | Quehnberger |
| 2010/0332089 | A1 | 12/2010 | Gianone et al. |
| 2011/0000332 | A1 | 1/2011 | Gianone et al. |
| 2011/0162482 | A1 | 7/2011 | Jacobs et al. |
| 2013/0240174 | A1 | 9/2013 | Matsusaka et al. |
| 2014/0084195 | A1 | 3/2014 | Hakoda et al. |
| 2014/0224891 | A1 | 8/2014 | Matsusaka et al. |
| 2014/0335990 | A1 | 11/2014 | Martucci et al. |
| 2015/0354691 | A1 | 12/2015 | Kenney et al. |

FOREIGN PATENT DOCUMENTS

| | | |
|---|---|---|
| EP | 2270364 A1 | 1/2011 |
| JP | 481556 A | 1/1973 |
| JP | 591870 A | 1/1984 |
| JP | 59001870 A  * | 1/1984  ......... F16H 57/0412 |

* cited by examiner

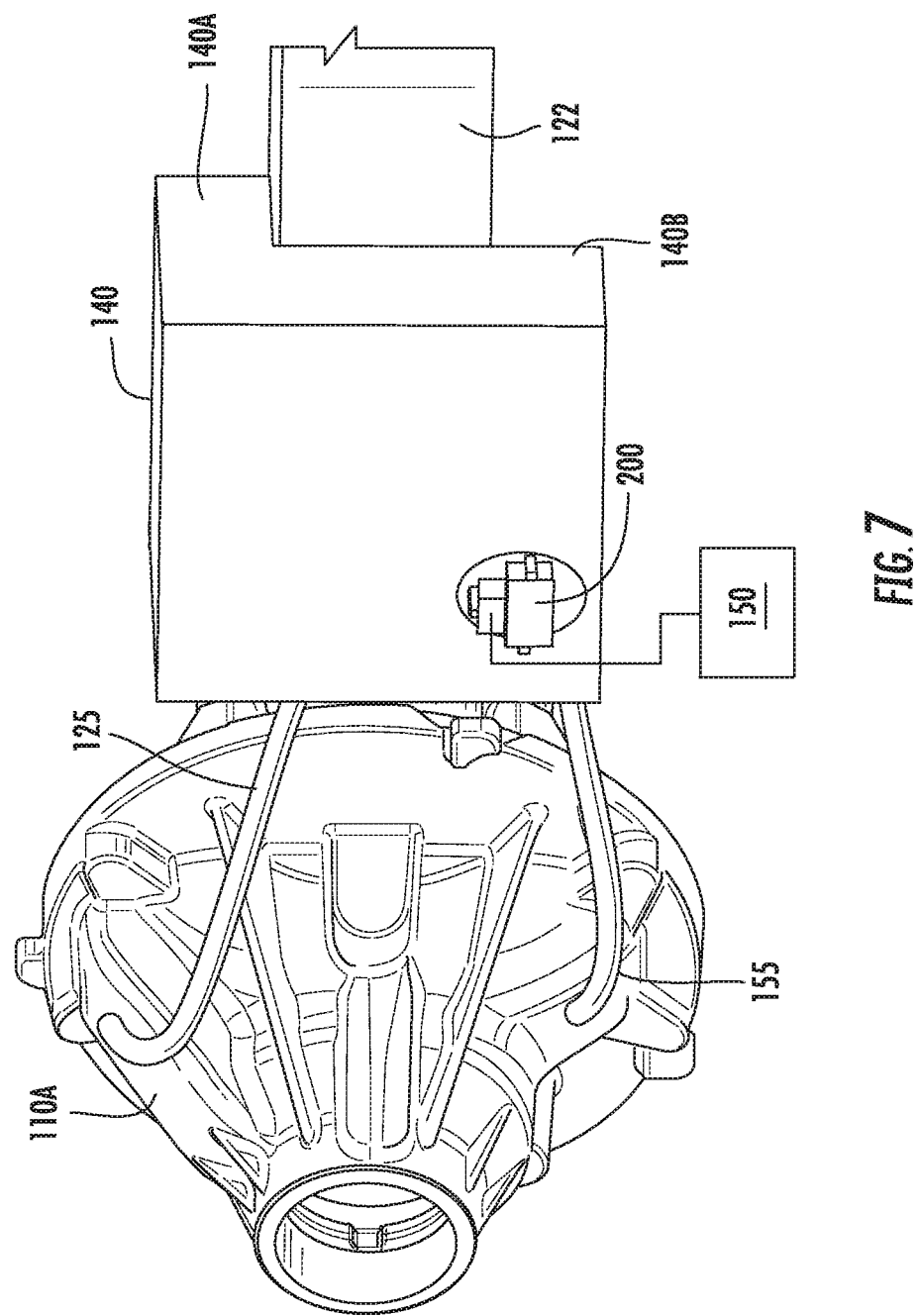

ACTIVE OIL MANAGEMENT SYSTEM FOR AXLES

BACKGROUND

The present disclosure relates to power transmission components and lubrication systems. Axle assemblies in wheeled vehicle drivetrains are known to employ a differential apparatus to permit an outer drive wheel to rotate at a greater velocity than an inner drive wheel when operating a vehicle through a turn. Differential apparatuses often employ a pinion gear drivingly engaged with a ring gear, which in turn rotates a differential case having a number of planet gears or bevel gears coupled with a pair of axles. The differential apparatus is located within a carrier housing of the axle assembly. Conventionally, a sump in the carrier housing contains lubricant to reduce friction between surfaces including, but not limited to, the pinion gear and ring gear, and a pair of side gears and a pair of pinion carrier gears. The lubricant may also disperse heat generated between the components of the axle assembly.

In conventional axle assemblies, lubricant churning can decrease axle assembly and vehicle efficiency, increase operating temperatures, and reduce the life of axle assembly components. For example, the volume of lubricant in the sump necessary for certain conditions may be excessive in many instances. During ordinary operation of a vehicle including the axle assembly, when torque loads are below a certain value, the volume of lubricant may result in excess windage of the drive pinion, the differential apparatus, and the pair of axles. Parasitic drag may also be exaggerated when the ambient temperature of the carrier housing is greatly reduced, such as during operation in cold weather. Additionally, during operation in cold weather, the volume of lubricant may disperse heat generated between the moving parts at a rate which prevents a viscosity of the volume of lubricant from decreasing, resulting in increased drag.

Reducing the volume of lubricant disposed in the sump to reduce windage also reduces the effectiveness and reliability of the axle assembly in certain conditions. For example, during a torque intensive operation, a reduced volume of lubricant may not adequately reduce the friction generated between contacting parts such as the drive pinion, the differential apparatus, and the pair of axles. As a result, the components may suffer excessive wear and operate in a noisy or harsh manner. Additionally, reduced volume of lubricant may be unable to disperse heat generated between the moving parts at a rate which prevents premature degradation of the lubricant, or causes damage to seals in the carrier housing.

The present subject matter discloses a method and apparatus which enables control of the lubricant level in an axle assembly in a simple and cost effective manner.

SUMMARY

The present disclosure provides an apparatus for regulating lubricant including a carrier housing having a lubricant sump. A ring gear disposed within the carrier housing, wherein the ring gear is partially disposed in the lubricant sump. A lubricant catch is disposed in the carrier housing, and a reservoir is disposed outside of the carrier housing. A first conduit is disposed between the lubricant catch and the reservoir. A second conduit is disposed between the reservoir and the lubricant sump. A valve is in fluid communication with the reservoir and the lubricant sump.

BRIEF DESCRIPTION OF THE SEVERAL VIEWS OF THE DRAWINGS

The accompanying drawings, incorporated herein as part of the specification, illustrate the presently disclosed subject matter, and with the description, serve to explain the principles of the disclosed subject matter and to enable a person skilled in the pertinent art to make and use the disclosed subject matter.

FIG. 7 is a perspective view of a portion of an axle assembly according to an embodiment of the presently disclosed subject matter.

DETAILED DESCRIPTION OF EMBODIMENTS

Figure 1:
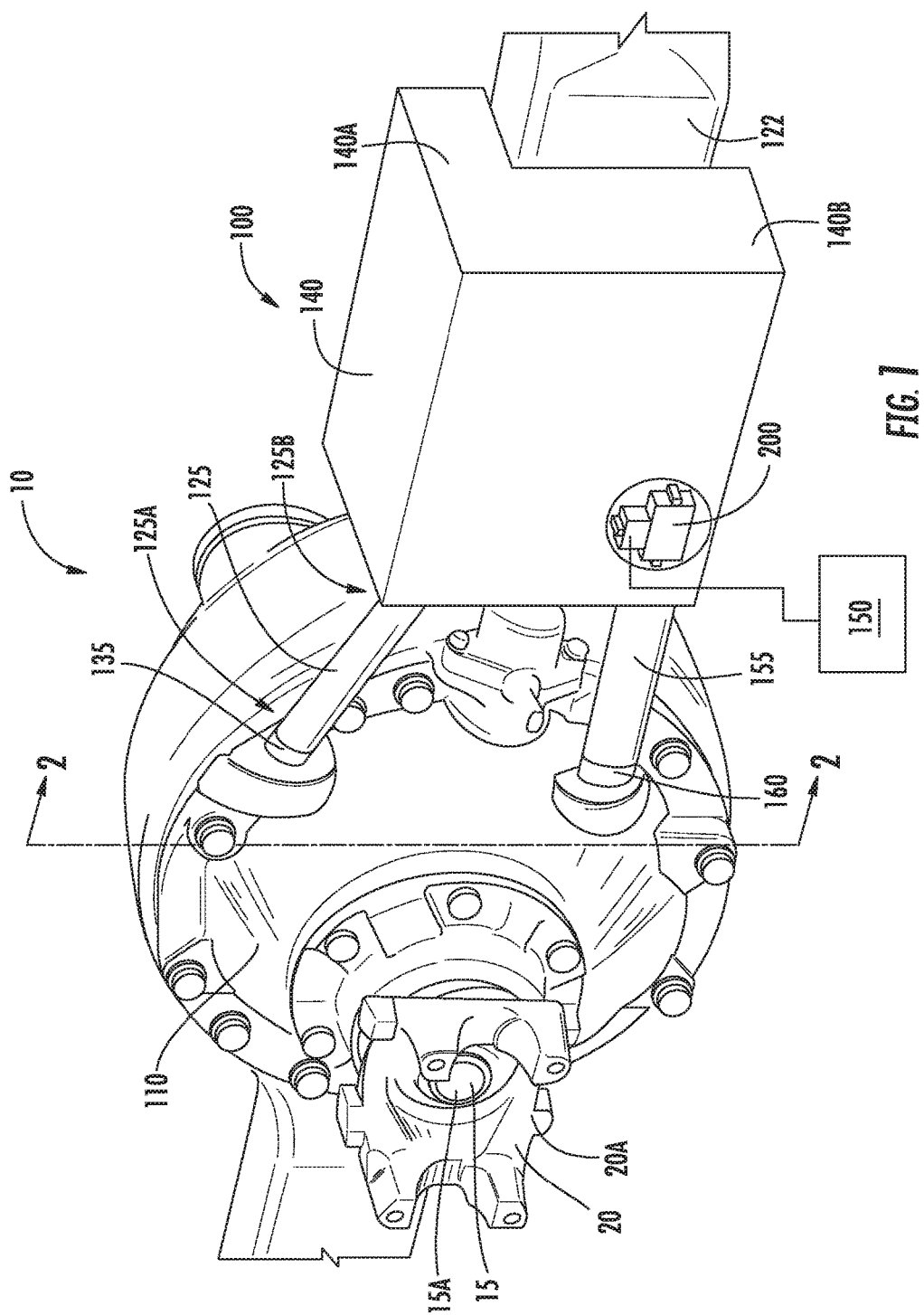
FIG. 1 is a perspective view of a portion of an axle assembly according to an embodiment of the presently disclosed subject matter.

It is to be understood that the invention may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

As illustrated in FIG. 1, certain embodiments of an axle assembly 10 comprise an active lubricant management system 100. However, the active lubricant management system 100 is not limited to use with the axle assembly 10 described herein. Instead, the active lubricant management system 100 may be utilized with axle assemblies of other shapes, sizes, orientations, and designs.

In an embodiment, the axle assembly lubricant management system 100 comprises a pinion shaft 15. The pinion shaft 15 includes a first end 15A and a second end (not depicted). Coupled with the first end 15A of the pinion shaft 15 is a universal joint assembly 20; a portion 20A of the universal joint assembly is illustrated in FIG. 1. The second end of the pinion shaft 15 is coupled with a drive pinion (not depicted). The pinion shaft 15 is rotatably supported in a carrier housing 110 and receives torque from a propeller shaft (not depicted) coupled with a transmission (not depicted), where the transmission is coupled with a power source such as, but not limited to, an engine (not depicted), a traction battery (not depicted), or a fuel cell (not depicted).

In turn, the pinion shaft 15 transmits rotational drive to a ring gear 25 (seen in FIG. 2) in continuous meshing engagement with the drive pinion.

Figure 2:
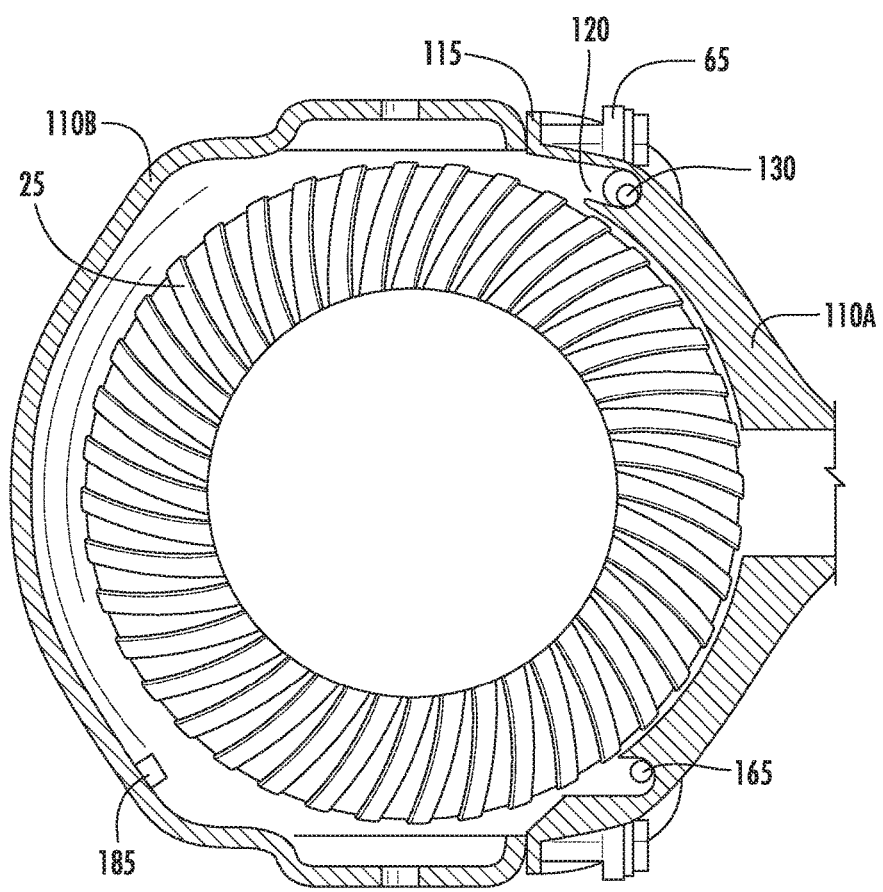
FIG. 2 is a cross-sectional view of a portion of the axle assembly according to FIG. 1.
Figure 3:
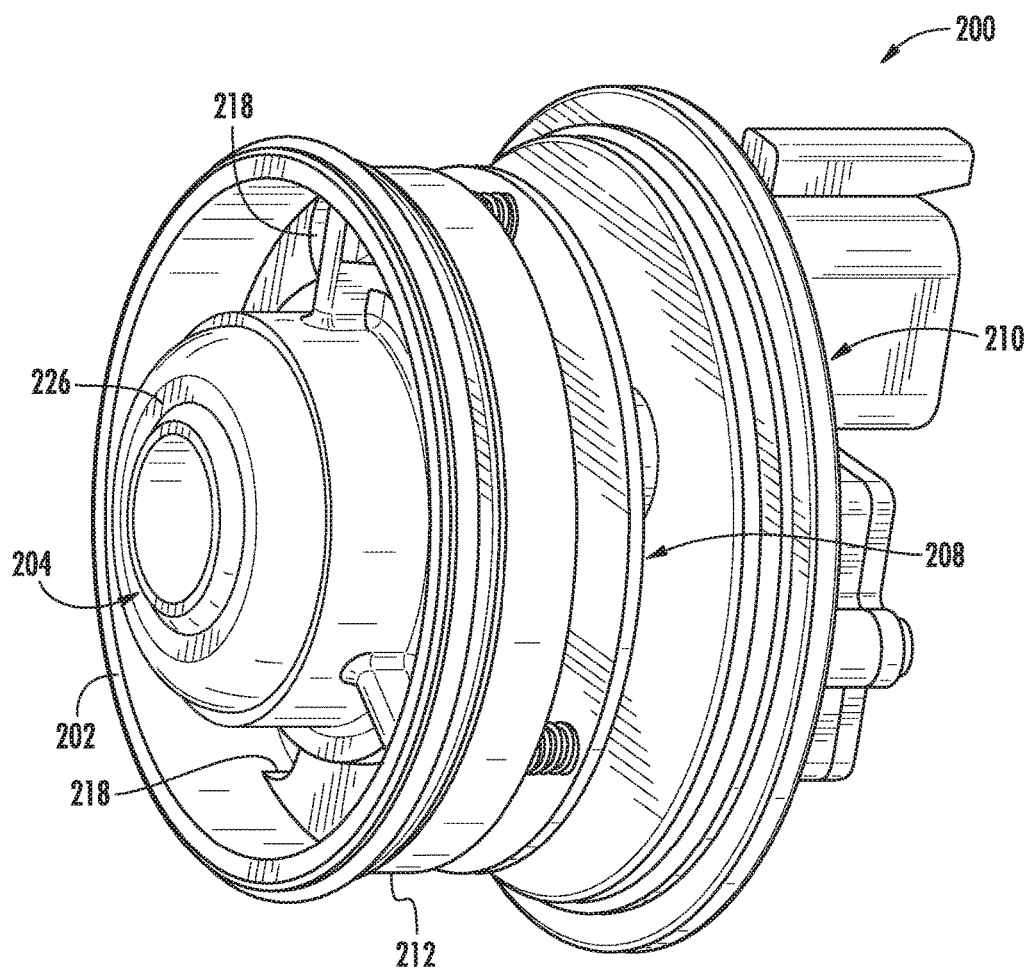
FIG. 3 is a perspective view of a valve according to an embodiment of the presently disclosed subject matter.
Figure 4:
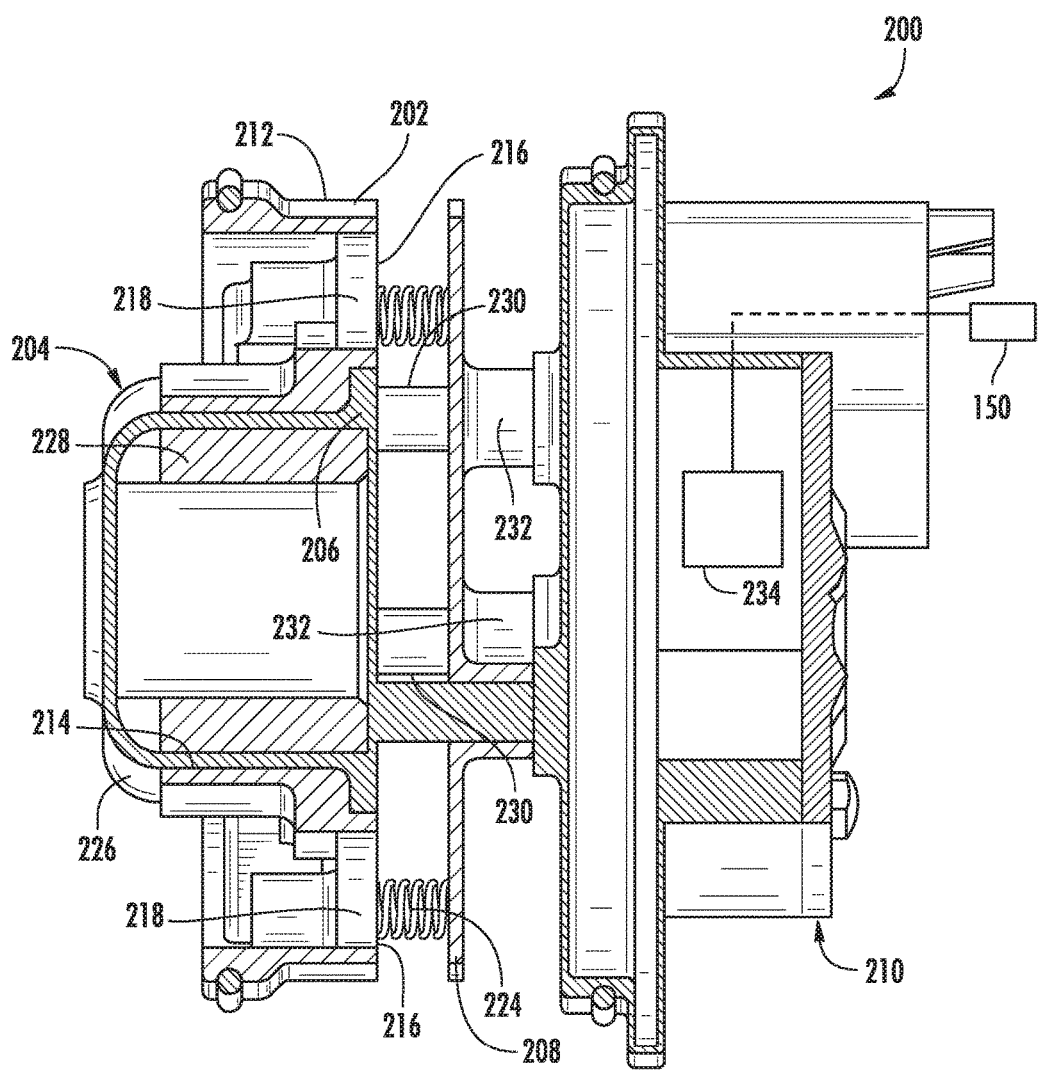
FIG. 4 is a cross-sectional view of the valve illustrated in FIG. 3.

Now referring to FIG. 2, the ring gear 25 is coupled with a differential case assembly (not depicted). The differential case assembly may be fixed to the ring gear via a plurality of fasteners, and rotates with the ring gear 25. The differential case assembly may include a differential case mounted for rotation within the carrier housing 110 via a pair of differential bearings (not depicted) coupled with a pair of differential bearing caps (not depicted).

In an embodiment, the differential case houses one or more pinion gears mounted on at least one pinion shaft. The one or more differential pinion gears are meshed with side gears (not depicted) within the differential case. The side gears comprise radially inward projecting splines which engage respective axle half shafts (not depicted), or intermediate shafts (not depicted). The differential case further comprises a pair of axle half shaft bores (not depicted). The axle half shafts are inserted through the bores into engagement with the side gears. The axle half shafts comprise splines which engage the splines of the side gears. In an embodiment, the axle half shafts are secured in their position in the differential case by c-clips (not depicted) inserted into grooves in the axle half shafts.

As illustrated in FIGS. 1 and 2, in an embodiment, the carrier housing 110 comprises a forward portion 110A and a rearward portion 110B. The forward portion 110A of the carrier housing 110 comprises a flange 115 for coupling the rearward portion 110B with the forward portion 110A via a plurality of fasteners 65. The carrier housing 110 comprises an outer surface 170 and an inner surface 175, the inner and outer surfaces 170, 175 defined by the forward and rearward portions 110A, 110B. The forward portion 110A of the carrier housing 110 comprises a lubricant catch 120 in fluid communication with an inlet conduit 125.

In an embodiment, the lubricant catch 120 is disposed at a top portion of the forward portion 110A. In an embodiment, the lubricant catch 120 may be defined by the forward portion 110A to comprise a space having a generally cylindrical geometry. The lubricant catch 120 may be defined by the forward portion 110A to have a shape comprising a portion of a cylinder which has been divided through a plane parallel to a longitudinal axis of the lubricant catch 120. In another embodiment, the lubricant catch 120 may comprise a space defined by half of a right circular cylinder. In yet another embodiment, the lubricant catch 120 may comprise a space defined by a conical or a hemispherical geometry. Further, the lubricant catch 120 may be cast with the carrier housing forward portion 110A during manufacture of the carrier housing 110. However, in another embodiment, the lubricant catch 120 may be produced after the carrier housing 110 forward portion 110A is cast, via machining such as, but not limited to, boring, drilling, and chemical machining.

As best illustrated in FIG. 2, the lubricant catch 120 includes an aperture 130 therein. The aperture 130 extends from the lubricant catch 120 interior to the exterior surface of the carrier housing 110 forward portion 110A. The aperture 130 may be cast with the carrier housing 110 forward portion 110A during manufacture thereof, or may be produced via machining, including, but not limited to, boring, drilling, chemical machining, or a combination thereof. Additionally, the aperture 130 may comprise a threaded portion therein.

Figure 5:
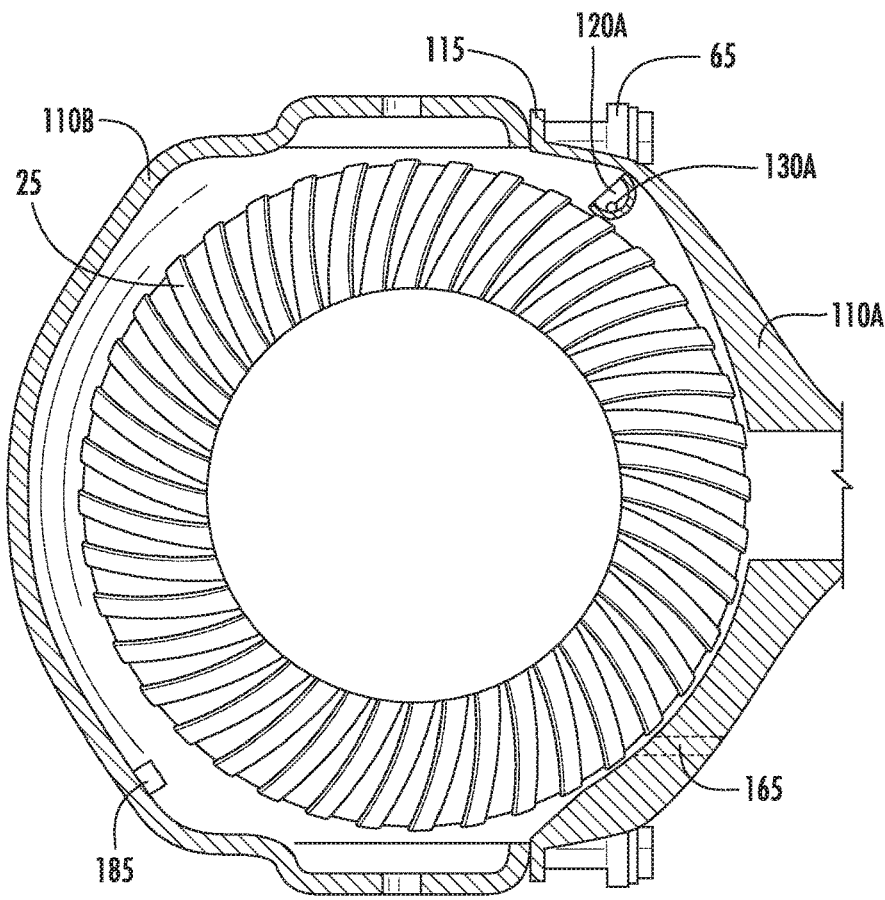
FIG. 5 is a cross-sectional view of a portion of an axle assembly according to an embodiment of the presently disclosed subject matter.
Figure 6:
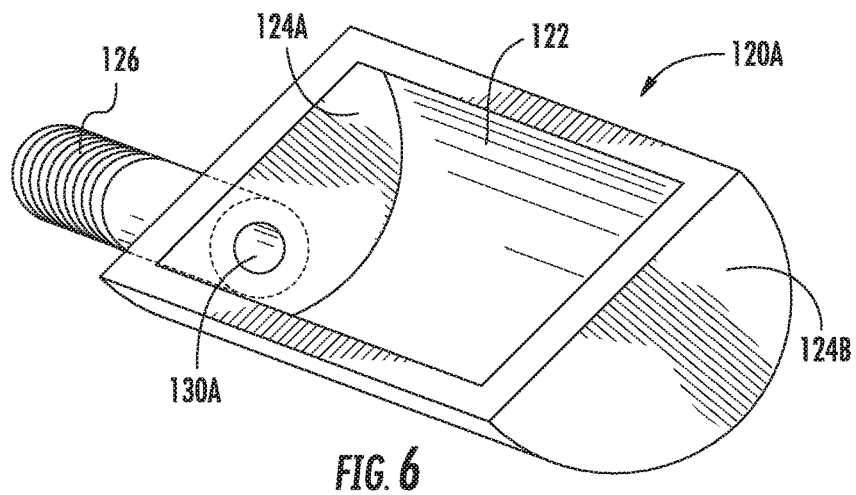
FIG. 6 is a perspective view of a lubricant catch as illustrated in FIG. 5.

In another embodiment, as illustrated in FIGS. 5-6, a separable lubricant catch 120A may be coupled with the carrier housing forward portion 110A. The lubricant catch 120A may comprise a generally semi-cylindrical receiving portion 122 for collecting lubricant slung by the ring gear 25. End portions 124A, 124B may be disposed at either end of the receiving portion 122. Further, a connector 126 may be coupled with the end portion 124A or the receiving portion 122. An aperture 130A is disposed through end portion 124A and is in fluid communication with a port through the connector 126. In an embodiment, the inlet conduit 125 includes a first end 125A coupled with the lubricant catch 120, 120A via a threaded connector 135 connectedly disposed in the aperture 130. A person having ordinary skill in the related art will recognize that the inlet conduit 125 may be coupled with the lubricant catch 120, 120A aperture 130 via a conventional fitting. In an embodiment, the threaded connector 135 may be coupled with the lubricant catch connector 126.

In yet another embodiment, as illustrated in FIG. 7, the active lubricant management system 100 may be applied to a carrier housing 110 already having a lubricant catch 120 cast therewith for lubricating the pinion bearings. In this embodiment, the inlet conduit 125 may be coupled with a portion of the cast lubricant catch 120 via an aperture machined through the carrier housing forward portion 110A. The inlet conduit 125 may then convey a portion of the lubricant in the lubricant catch 120 therethrough.

In one embodiment, a first valve (not depicted) may be disposed in the inlet conduit 125 inside or adjacent the threaded connector 135. The first valve may be electronically coupled with an external controller 150 which may open or close the first valve when predetermined conditions are satisfied, or based upon input from a vehicle operator. In certain embodiments, the first valve may comprise an internal controller. In an embodiment, the first valve may be a solenoid valve.

Furthermore, as best illustrated in FIG. 1, the inlet conduit 125 includes a second end 125B in fluid communication with a reservoir 140. The second end 125B of the inlet conduit 125 may be coupled with an inlet aperture (not depicted) in the reservoir 140 via a connector (not depicted) similar to the threaded connector 135, or by any conventional method known in the art. In an embodiment, the inlet conduit 125 may be a flexible conduit. For example, the inlet conduit 125 may be comprised of an elastomeric material or a corrugated metal.

The reservoir 140 is disposed on the outside of an axle housing 145. The axle housing 145 is coupled with the carrier housing 110. In an embodiment, the axle housing 145 is formed unitary and integral with the carrier housing 110. The axle housing 145 comprises a generally hollow member through which an axle half shaft or intermediate shaft may be disposed.

In an embodiment, the reservoir 140 comprises a first portion 140A, and a second portion 140B. In an embodiment, the first portion 140A is at least partially disposed on a top portion of the axle housing 145. A bottom interior surface (not depicted) of the reservoir first portion 140A may be disposed at an acute angle to the top portion of the axle housing 145, such that the bottom interior surface is angled toward the second portion 140B. In an embodiment, the reservoir second portion 140B is at least partially disposed on a side portion of the axle housing 145. In an embodiment, the reservoir 140 may comprise a cross-section having a generally upside-down "L" shape. However, persons having skill in the art will recognize that the reservoir 140 may comprise any shape compatible with the vehicle layout. The reservoir 140 may be secured to the axle housing 145 via welding or mechanical fasteners. In an embodiment (not depicted) where the reservoir 140 comprises a hollow generally annular member, the reservoir 140 may be press fit to the axle housing 145. In certain embodiments, the reservoir 140 comprises a holding volume of half the lubricant volume utilized in a lubricant sump 180. The reservoir 140 may made from, but is not limited to, steel, aluminum, elastomeric material, polymeric material, or a combination thereof.

The second portion 140B further comprises an outlet aperture (not depicted). The outlet aperture may be coupled with an outlet conduit 155 via a connector (not depicted). A second valve 200 is disposed at least partially in the outlet aperture to control the flow of lubricant from the reservoir 140 to the outlet conduit 155. In an embodiment, the outlet conduit 155 may be a flexible conduit. For example, the outlet conduit 155 may be comprised of an elastomeric material or a corrugated metal.

In an embodiment, as illustrated in FIG. 7, the inlet and outlet conduits 125, 155 and the reservoir 140 may be molded as a unitary and integral component. In one embodiment, the integral reservoir 140 and conduits 125, 155 may be formed of a metal such as, but not limited, to steel or aluminum. In this embodiment, the inlet and outlet conduits 125,155 are inflexible, and each reservoir 140 having integral conduits 125, 155 may be designed for application to a particular axle assembly type.

In an embodiment, the second valve 200 may be as described in U.S. Pat. No. 9,458,922 B2, the entire disclosure of which is hereby incorporated by reference. The second valve 200 includes a base portion 202, an electromagnetic coil assembly 204, at least one guide member 206, a sealing member 208, and a valving cavity cover 210. The base portion 202 is generally annular, and is coupled with the coil assembly 204. The base portion 202 comprises a plurality of biasing member apertures 216, and a plurality of lubricant perforations 218. The base portion 202 may be formed by molding a plastic; however, it will be understood by persons having skill in the art that the base portion 202 may be formed from any other material. A side of the base portion 202 facing the valving cavity cover 210 may include an annular seal disposed therein for engaging the sealing member 208.

In an embodiment, an outer surface 212 of the base portion 202 may be sealingly coupled with the outlet conduit 155 connector. In another embodiment, the base portion outer surface 212 may be sealingly coupled with a portion of the reservoir 140. In yet another embodiment, the base portion outer surface 212 may be sealingly coupled with the outlet conduit 155. The base portion 202 may be coupled with the electromagnetic coil assembly 204 via a press fit. However, a person having skill in the art will recognize that any conventional method of fastening such as, but not limited to, mechanical fasteners, adhesives, and welding, may be utilized to couple the base portion 202 and the electromagnetic coil assembly 204.

The plurality of biasing member apertures 216 are formed in the base portion 202 between the outer surface 212 and an inner surface 214 thereof. In an embodiment, the biasing member apertures 216 define a cup-like shape in the base portion 202. A biasing member 224 is disposed in each of the biasing member apertures 216. In an embodiment, the base portion 202 may define a biasing member aperture 216 comprising an annular groove (not depicted) for receipt of a single biasing member.

The plurality of lubricant perforations 218 are formed through the base portion 202 between the outer surface 212 and the inner surface 214. In an embodiment, the base portion 202 includes six lubricant perforations 218 spaced equiangular about the base portion 202. The plurality of lubricant perforations 218 facilitate fluid communication through the base portion 202 when the sealing member 208 is sealingly disengaged from the base portion 202.

The coil assembly 204 is a generally cylindrical shaped body disposed in the base portion 202. The coil assembly 204 is spaced apart from the valving cavity cover 210. The coil assembly 204 comprises a cover portion 226 and a coil portion 228. The cover portion 226 is a hollow body into which the coil portion 228 is disposed. In an embodiment, the cover portion 226 may be formed by molding a plastic; however, a person having skill in the art will recognize that the cover portion 226 may be formed from other materials. The coil portion 228 is in electrical communication with a portion of the valving cavity cover 210.

The guide member 206 may comprise a generally disk shaped body having a plurality of protuberances 230 extending therefrom. The guide member 206 is coupled to at least one of the coil assembly 204 and the base portion 202. The protuberances 230 are coupled to the valving cavity cover 210. In an embodiment, at least one of the protuberances 230 is hollow, and acts as a conduit to permit electrical communication to be facilitated between the valving cavity cover 210 and the coil 228. The guide member 206 may be formed by molding a plastic; however, a person having skill in the art will recognize that the guide member 206 may be formed from other materials. In another embodiment, the guide member 206 may be integrally formed with one of the valving cavity cover 210, the base portion 202, and the coil assembly 204.

The sealing member 208 comprises a generally disk shaped body having a plurality of plate guides 232 extending therefrom. The plate guides 232 are hollow protuberances corresponding to, and sized to receive, each of the guide member protuberances 230. The sealing member 208 is slideably disposed on the protuberances 230, and may be moved along the protuberances 230 to contact the base portion 202 or the valving cavity cover 210. The sealing member 208 is formed from a ferrous material. The plurality of biasing members 224 disposed in the biasing member apertures 216 are also disposed against the sealing member 208. The sealing member 208 is urged towards the valving cavity cover 210 by the plurality of biasing members 224.

The valving cavity cover 210 is coupled with the guide member protuberances 230. In an embodiment, the valving cavity cover 210 may be sealingly disposed against a portion of the reservoir 140. The valving cavity cover 210 may be formed by molding a plastic; however, a person having skill in the art will recognize that the valving cavity cover 210 may be formed from other materials. The valving cavity cover 210 may include at least a portion of a controller (not shown) or may facilitate electrical communication between the controller 150 and the coil portion 228. The valving cavity cover 210 may facilitate electrical communication between the controller 150 and the coil portion 228 through the use of a plug style electrical fitting. Further, the valving cavity cover 210 may include at least one sensor 234. As a nonlimiting example, the at least one sensor 234 may be a temperature sensor utilized to monitor a temperature of the lubricant in the reservoir 140, or to monitor a temperature of the second valve 200.

The second valve 200 comprises a first position and a second position. When the second valve 200 is placed in the first position, the sealing member 208 is sealingly engaged with the base portion 202. Further, in the second valve 200 first position, lubricant entering the reservoir 140 collects therein. As illustrated in FIGS. 13 and 13, when the second valve 200 is placed in the second position, the sealing member 208 is spaced apart from the base portion 202 by the urging of the plurality of biasing members 224. The second valve 200 second position allows the lubricant entering the reservoir 140, and the lubricant collected therein, to drain from the reservoir 140. If the second valve 200 were to suffer an electrical or mechanical failure which compromised the performance of the second valve 200, the second valve 200 would fail to the second position, in which lubricant may drain from the reservoir 140.

An end of the outlet conduit 155 opposite the reservoir 140 is coupled with an aperture 165. In an embodiment, a threaded connector 160 may be utilized to couple the outlet conduit 155 with the aperture 165. In an embodiment, the aperture 165 extends from the exterior surface 170 of the carrier housing forward portion 110A to the interior surface 175 of the carrier housing forward portion 110A. In another embodiment, the aperture 165 extends from the exterior surface 170 of the carrier housing rearward portion 110B to the interior surface 175 of the carrier housing rearward portion 110B. The aperture 165 may be cast with the carrier housing 110 during manufacture thereof, or may be produced via methods including, but not limited to, boring, drilling, chemical machining, or a combination thereof. Additionally, the aperture 165 may comprise a threaded portion therein. An interior of the carrier housing 110 comprises the lubricant sump 180 where lubricant is collected and utilized by the axle assembly 10.

In operation, gear teeth of the ring gear 25 carry lubricant from the lubricant sump 180 and fling the lubricant into the lubricant catch 120, 120A. The lubricant flows through the lubricant catch 120, 120A to the aperture 130. After reaching the aperture 130 the lubricant flows to the first valve. If the predetermined conditions are not satisfied, the first valve will remain closed and the lubricant will remain in the lubricant catch 120, 120A and the lubricant sump 180. If the predetermined conditions are satisfied, or the vehicle operator inputs a request to open the first valve, the first valve will be placed in an open position. The lubricant will then flow through the inlet conduit 125 to the reservoir first portion 140A. The lubricant collects in the reservoir first and second portions 140A, 140B if the second valve 200 is in the first position (i.e., closed). If predetermined conditions are satisfied, or the vehicle operator inputs a request to open the second valve 200, the second valve 200 will be placed in the second position. When the second valve 200 is placed in the second position, the lubricant flows from the reservoir 140, through the outlet conduit 155, through the aperture 165, and into the lubricant sump 180.

In an embodiment, the lubricant management system 100 does not include a first valve, and flow of the lubricant is controlled via the second valve 200. In an embodiment, the lubricant catch 120, 120A, the aperture 130, the threaded connector 135, the inlet conduit 125, the reservoir 140, the outlet conduit 155, the outlet conduit connector, the threaded connector 160, and the aperture 165 may be added to a carrier housing and an axle housing not previously having a lubricant management system, as in an aftermarket application. Positioning the reservoir 140 on an exterior of the axle housing 145 enables the lubricant management system 100 to be applied aftermarket to a large number of existing vehicles, including those vehicles having a small carrier housing 110 package area.

Additionally, in an embodiment, a second temperature sensor 185 may be located in the lubricant sump 180 to ascertain the temperature of the lubricant therein. In an embodiment, the temperature sensor 185 may be coupled via at least one wire with the controller 150 to communicate a temperature signal thereto. In another embodiment, the temperature sensor 185 may be of the wireless variety. When the second temperature sensor 185 is of the wireless variety, the signal provided by the second temperature sensor 185 is transmitted to the controller 150 without a wire, or a lead, connecting the second temperature sensor 185 and the controller 150. In an embodiment, the signal transmitted to the controller 150 may be in the form of one or more radio waves. In this embodiment, the second temperature sensor 185 may be in communication with a radio transmitter. The temperature sensor 185 may comprise a temperature measuring circuit which wirelessly transmits a signal to the controller 150, and comprise wires electronically coupling the temperature sensor 185 with a power source.

In an embodiment, the lubricant management system 100 may include a torque sensor (not depicted) utilized to determine the torque load on the axle assembly 10. The torque sensor may be disposed on any shaft that sees the drivetrain torque. In an embodiment, the torque sensor may be disposed on the transmission output. In another embodiment, the torque sensor may be disposed on the axle half shafts or the differential case. In an embodiment, the torque sensor may be coupled via at least one wire with the controller 150 to communicate a torque signal thereto. In another embodiment, the torque sensor may be of the wireless variety, such that the signal provided by the torque sensor is transmitted to the controller 150 without a wire, or a lead, connecting the torque sensor and the controller 150. In an embodiment, the signal transmitted by the torque sensor to the controller 150 may be in the form of one or more radio waves. In this embodiment, the torque sensor may be in communication with a radio transmitter. The torque sensor may comprise wires electronically coupling the torque sensor with a power source. The second temperature sensor 185, and/or the torque sensor, may provide information about the axle assembly 10 which is utilized by the controller 150 to control the first valve, and/or the second valve 200.

In an additional embodiment (not depicted), the lubricant management system 100 may include a second reservoir (not depicted) disposed on the carrier housing 110, or on a second axle housing opposite said axle housing 145. In this embodiment, a third conduit disposed between said lubricant catch 120, 120A and said second reservoir provides fluid communication between the lubricant catch 120, 120A and the second reservoir. A valve may be located in the third conduit or the lubricant catch 120, 120A to control lubricant flow to the second reservoir. A fourth conduit disposed between the second reservoir and the lubricant sump 180 provides fluid communication between the second reservoir and the lubricant sump 180. A valve disposed between, or inside, the second reservoir and/or the fourth conduit may be utilized to control lubricant flow between the second reservoir and the lubricant sump 180. In an embodiment, the second reservoir may be similar to the reservoir 140. In another embodiment, the second reservoir may comprise any shape compatible with the vehicle layout. Having a second reservoir enables the size of the reservoir 140 and the second reservoir to be greatly reduced, while still capable of holding 50% of the lubricant utilized in the lubricant sump 180. Reducing the size of the reservoirs reduces their packaging size such that they may be retrofitted to a greater number of vehicles.

While various embodiments have been described above, it should be understood that they have been presented by way of example, and not limitation. It will be apparent to persons skilled in the relevant art that the disclosed subject matter may be embodied in other specific forms without departing from the spirit or essential characteristics thereof. The embodiments described above are therefore to be considered in all respects as illustrative, not restrictive.

What is claimed is:

1. An apparatus for regulating lubricant, comprising:
   a carrier housing having a lubricant sump;
   a ring gear disposed within said carrier housing, wherein said ring gear is partially disposed in said lubricant sump;
   a lubricant catch disposed in said carrier housing;
   a reservoir formed separate and apart from said carrier housing;
   a first conduit disposed between said lubricant catch and said reservoir;
   a second conduit disposed between said reservoir and said lubricant sump; and
   a first valve in fluid communication with said reservoir and said lubricant sump, wherein said first valve is at least partially disposed in said reservoir separate and apart from said carrier housing and said lubricant sump.

2. The apparatus for regulating lubricant of claim 1, further comprising:
   a second valve disposed in said first fluid conduit between said lubricant catch and said reservoir.

3. The apparatus for regulating lubricant of claim 1, further comprising:
   a controller in electronic communication with said first valve; and
   a temperature sensor disposed in said lubricant sump, wherein said temperature sensor is in electronic communication with said controller.

4. The apparatus for regulating lubricant of claim 1, further comprising:
   a controller in electronic communication with said first valve; and
   a torque sensor disposed on an axle half shaft, wherein said torque sensor is in electronic communication with said controller.

5. The apparatus for regulating lubricant of claim 1, further comprising:
   a first axle housing coupled with said carrier housing; and
   said reservoir coupled with said first axle housing.

6. The apparatus for regulating lubricant of claim 5, wherein said reservoir comprises:
   a first portion;
   a second portion;
   said first portion coupled with a top of said axle housing;
   said second portion coupled with a side of said axle housing; and
   said first portion and said second portion in fluid communication.

7. The apparatus for regulating lubricant of claim 6, wherein said reservoir first portion comprises:
   a bottom internal surface angled to direct lubricant toward said second portion.

8. The apparatus for regulating lubricant of claim 1, wherein said first conduit comprises:
   a flexible hose having a first end and a second end;
   said first end coupled with said lubricant catch; and
   said second end coupled with said reservoir.

9. The apparatus for regulating lubricant of claim 2, wherein said first conduit comprises:
   a flexible hose having a first end and a second end;
   said first end coupled with said lubricant catch;
   said second end coupled with said reservoir;
   said second valve disposed between said first end and said lubricant catch.

10. The apparatus for regulating lubricant of claim 1, wherein said second conduit comprises:
    a flexible hose having a first end and a second end;
    said first end coupled with said reservoir; and
    said second end coupled with lubricant sump.

11. The apparatus for regulating lubricant of claim 5, further comprising:
    a second axle housing coupled with said carrier housing;
    a second reservoir coupled with said second axle housing;
    a third conduit disposed between said lubricant catch and said second reservoir;
    a fourth conduit disposed between said second reservoir and said lubricant sump; and
    a third valve in fluid communication with said second reservoir and said lubricant sump.

12. The apparatus for regulating lubricant of claim 1, wherein said lubricant catch further comprises:
    a receiving portion; and
    a connector for coupling said receiving portion with said carrier housing, wherein said connector comprises a port in fluid communication with said first conduit.

13. A method of applying an apparatus to an axle assembly for regulating lubricant, comprising:
    providing an axle assembly including:
       a carrier housing having a lubricant sump;
       a ring gear disposed within said carrier housing, wherein said ring gear is partially disposed in said lubricant sump;
       an axle housing coupled with said carrier housing;
    machining a lubricant catch into said carrier housing above said lubricant sump;
    machining a first aperture through said carrier housing into fluid communication with said lubricant catch;
    machining a second aperture through said carrier housing above said lubricant sump;
    coupling a reservoir with said axle housing;
    coupling a first fluid conduit with said first aperture and said reservoir, whereby said lubricant catch and said reservoir are in fluid communication;
    coupling a second fluid conduit with said reservoir and said second aperture; and
    disposing a valve in said reservoir, whereby said reservoir and said lubricant sump are in selective fluid communication.

14. A method of applying an apparatus to an axle assembly for regulating lubricant, comprising:
    providing an axle assembly including:
       a carrier housing having a lubricant sump;
       a ring gear disposed within said carrier housing, wherein said ring gear is partially disposed in said lubricant sump;
       an axle housing coupled with said carrier housing;
    machining a first aperture through said carrier housing above said lubricant sump;
    machining a second aperture through said carrier housing above said lubricant sump;
    coupling a lubricant catch with said carrier housing in fluid communication with said first aperture;
    coupling a reservoir with said axle housing;
    coupling a first fluid conduit with said first aperture and said reservoir, whereby said lubricant catch and said reservoir are in fluid communication;
    coupling a second fluid conduit with said reservoir and said second aperture; and disposing a valve in said reservoir, whereby said reservoir and said lubricant sump are in selective fluid communication.

\* \* \* \* \*

UNITED STATES PATENT AND TRADEMARK OFFICE
CERTIFICATE OF CORRECTION

PATENT NO. : 10,190,673 B2
APPLICATION NO. : 15/365251
DATED : January 29, 2019
INVENTOR(S) : Michael Z. Creech and Marcus W. Schmidt It is certified that error appears in the above-identified patent and that said Letters Patent is hereby corrected as shown below:

On the Title Page

Please change to the name as follows below:
Assignee: Dana Heavy Vehicle Systems Group, LLC, Maumee, OH (US)

Signed and Sealed this
Fourteenth Day of April, 2020

Andrei Iancu
*Director of the United States Patent and Trademark Office*